United States Patent [19]

Huffhines et al.

[11] Patent Number: 4,549,499

[45] Date of Patent: Oct. 29, 1985

[54] FLOATATION APPARATUS FOR MARINE SEISMIC EXPLORATION

[75] Inventors: Donald F. Huffhines, Richardson; Robert E. Roach, Duncanville, both of Tex.

[73] Assignee: Mobil Oil Corporation, New York, N.Y.

[21] Appl. No.: 588,429

[22] Filed: Mar. 12, 1984

Related U.S. Application Data

[63] Continuation of Ser. No. 265,131, May 19, 1981, abandoned.

[51] Int. Cl.⁴ ............................................. B63B 21/66
[52] U.S. Cl. ................................................... 114/244
[58] Field of Search .............. 114/242, 244, 245, 253, 114/254; 367/106, 153, 154; 244/1 TD, 2, 3

[56] References Cited

U.S. PATENT DOCUMENTS

| | | | |
|---|---|---|---|
| 2,652,550 | 9/1953 | Lash | 114/245 |
| 3,089,453 | 5/1963 | Buck et al. | 114/242 |
| 3,469,551 | 9/1969 | Lefebvre | 114/242 |
| 3,760,761 | 9/1973 | Umazume | 114/244 |
| 4,033,278 | 7/1977 | Waters | 114/245 |
| 4,313,392 | 2/1982 | Guenther et al. | 114/244 |

Primary Examiner—Jesus D. Sotelo
Attorney, Agent, or Firm—A. J. McKillop; Michael G. Gilman; Frank J. Kowalski

[57] ABSTRACT

A floatation apparatus is disclosed wherein a buoy for maintaining the near surface position of marine equipment is mounted on a hydrodynamically advantageous V-shaped frame to reduce frictional drag associated with towing surface equipment.

2 Claims, 4 Drawing Figures

FLOATATION APPARATUS FOR MARINE SEISMIC EXPLORATION

This is a continuation of copending application Ser. No. 265,131, filed on May 19, 1981, now abandoned.

BACKGROUND OF THE INVENTION

Marine seismic exploration for oil is typically done with the aid of a marine vessel which tows a line of seismic pulse sources. These sources generate acoustic pulses which penetrate subsea formations and are reflected back to a line of acoustic pulse detectors such as geophones. The line of pulse detectors may be either placed on the ocean floor or may also be towed behind the marine vessel.

In a typical marine seismic survey, as many as two lines of twenty seismic pulse sources and many miles of acoustic pulse detectors are towed by a single vessel. The sources and detectors are kept near the surface by floats or buoys.

Although there are several problems associated with a line of seismic pulse sources and detectors, such as deployment retrieval and storage, one of the most significant problems lies in the towing operation. These buoys can cause a significant amount of drag which reduces the speed at which the vessel may operate and may reduce the total number of seismic pulse sources and acoustic pulse detectors that may be used.

SUMMARY OF THE INVENTION

The present invention pertains to marine towing systems and more particularly to seismic pulse source towing systems comprising a string of acoustic pulse sources which are towed near the surface in a marine environment. A commercially available buoy is mounted on an expanded V-shaped frame having a fixed rudder. Connection is made at a predetermined angle between a leading edge of the frame and a towing cable. The frame angles the buoy in the water which reduces towing resistance to allow faster towing speeds and permits additional acoustic pulse sources with their associated bouys.

DESCRIPTION OF THE PREFERRED EMBODIMENT

Figure 1:
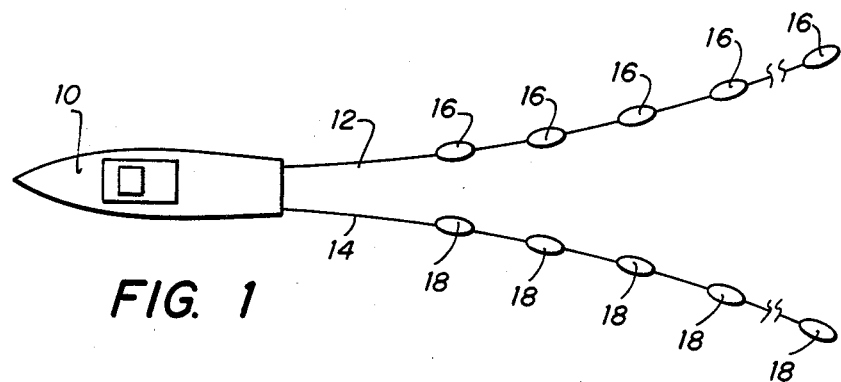
FIG. 1 is a plan view of a marine seismic system.
Figure 2:
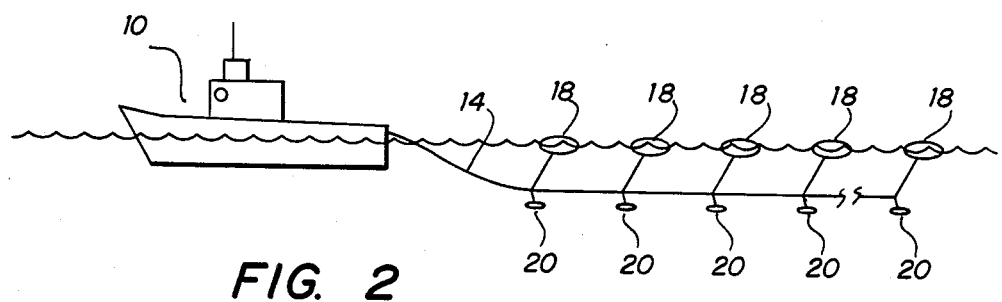
FIG. 2 is a side view of the system of FIG. 1.

FIG. 1 illustrates a marine vessel 10 towing seismic acoustic pulse source lines 12 and 14. Each line 12 and 14 includes a plurality of buoys 16 and 18 respectively. FIG. 2 illustrates a side view of the seismic exploration system of FIG. 1. Line 14 is illustrated as having an acoustic pulse source 20 below each buoy 18. There may be more than one pulse source 20 below each buoy 18, however, one buoy 18 is preferred for each pulse source 20 due to the combined weight of line 14 and pulse source 20.

In typical seismic exploration, as many as twenty acoustic pulse sources 20 may be attached to each of lines 12 and 14. In addition, marine vessel 10 may tow one or more lines of acoustic pulse detectors (not shown) and the total number of buoys used to keep both detectors and sources may be in the hundreds. This can result in a great amount of drag being exerted by the buoys. Thus, marine vessel 10 must be operated at slower speeds or the number of acoustic pulse sources 20 and detectors (not shown) must be reduced.

Figure 3:
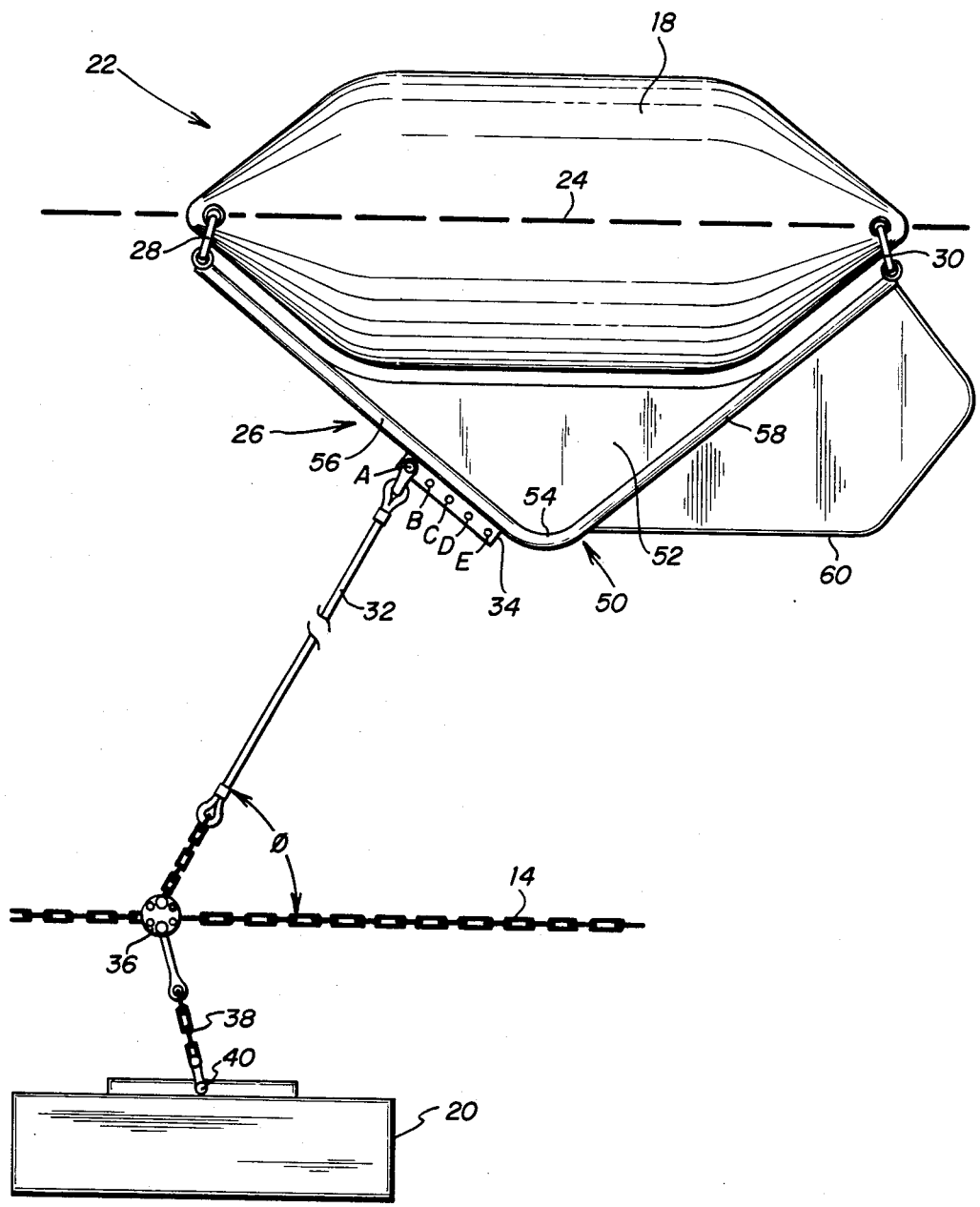
FIG. 3 is a side view of the present invention.

FIG. 3 illustrates a side view of a flotation system 22 having a buoy 18 rotatably mounted at the end points of its center line 24 on frame 26 at attachment points 28 and 30. Buoy 18 is mounted on frame 26 by chain links which permit a small amount of rotation about its center axis depicted by center line 24. Frame 26 is attached to line 14 by cable 32 which is fixed to adjustable bracket 34 at point A. Cable 32 may be attached to either point A, B, C, D or E of bracket 34 and is illustrated as attached to point A for descriptive purposes only.

Cable 32 is attached to line 14 at connector 36. Cable 38 is attached to seismic acoustic pulse source 20 at connector 40 and to line 14 at connector 36. Buoy 18 and pulse source 20 are illustrated as being attached to connector 36 on line 14 in the preferred embodiment. However, both are not required to be joined at the same location but may be spatially separated along line 14.

Frame 26 comprises a generally V-shaped base 50 having plate 52 bridging vertex 54 of arms 56 and 58 of base 50. Frame 26 may be constructed of any high strength rigid material, however, aluminum tubing is preferred for base 50 and sheet aluminum is preferred for plate 52. Aluminum provides high strength and low weight while also providing durability and resistance to salt water corrosion.

Plate 52 provides stabilization to prevent buoy 18 from turning while being towed by marine vessel 10. Without stabilizing plate 52, buoy 18 would have a propensity to turn so its broadside is perpendicular to its line of travel through the water, increasing its drag and decreasing the depth at which pulse source 20 is towed. Plate 52 maintains center line 24 perpendicular to the stern of marine vessel 10.

Attached to arm 56 is bracket 34 having a plurality of connection points A, B, C, D and E for connection of cable 32 between frame 26 and line 14.

Bracket adjustments A, B, C, D and E are provided depending upon the depth at which acoustic pulse source 20 is to be towed. When cable 32 is connected to adjustment A, pulse source 20 is towed at its shallowest depth, approximately twenty feet below the surface. When cable 32 is connected to adjustment E, pulse source 20 is towed at its deepest available depth, approximately 30 feet. Additional adjustments B through D give incremental depths for towing. Bracket 34 with adjustments A through D permit an operator to control the amount of drag exerted by buoy 18 when it is towed through the water. By controlling the drag, an angle $\phi$ between cable 32 and tow line 14, may be altered and the distance between the water surface, the location of buoy 18 and tow line 14 may be shortened or lengthened.

Rudder 60 is attached to arm 58 and generally extends the length of arm 58 from the vertex 54 of base 50 to the end of arm 58. The rudder is rotatably mounted on arm 58 to control the position of buoy 18 with respect to vessel 10. Buoy 18 travels on a line parallel to the line of motion of vessel 10 in the same plane, sea level, and the rudder controls the displacement of the line of travel for buoy 18 with respect to the parallel line of travel for vessel 10. Thus, rudder 60 controls the planar parallel placement of buoy 18 with respect to marine vessel 10. Rudder 60 also provides additional stabilization of float 18 when used in combination with plate 52.

Attachment points 28 and 30 at the end points of arms 56 and 58 respectively permit buoy 18 to partially rotate about center line 24. This allows buoy 18 to rotate slightly when subjected to forces different from those experienced to plate 52.

Figure 4:
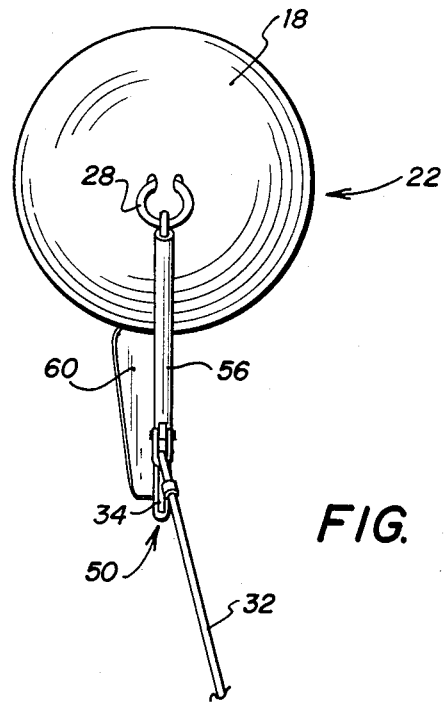
FIG. 4 is a front view of the apparatus of FIG. 3.

FIG. 4 is a front plan view of floatation system 22 illustrating buoy 18 as having a generally circular shape narrowing down to rounded point 28 where it is partially rotatably mounted on arm 56 of base 50. Rudder 60 is partially hidden from view by base 50 due to its narrower width than tubular base 50.

While the present invention has been described by way of a preferred embodiment, it is to be understood that the description is for example purposes only and the present invention should not be limited thereto but only by the scope of the following claims.

What is claimed is:

1. In combination:
   a marine vessel having a tow line;
   floatation means for maintaining the surface position of a marine apparatus;
   frame means attached to said floatation means for connecting said floatation means to said tow line;
   bracket means fixed to said frame means at an angle inclined to the horizontal having a plurality of adjustment means for altering the tow depth of said marine apparatus;
   rudder means moveably mounted on said frame means for controlling planar parallel placement of said floatation means with respect to said towing vessel; and
   stabilizer means mounted on said frame means for maintaining the center line of said floatation means perpendicular to said marine vessel.

2. A method for controlling the depth of a near surface marine apparatus towed by a marine vessel comprising the steps of:
   providing a floatation member having a frame with a plurality of slots arranged at an angle inclined to the horizontal for connection to a tow line;
   connecting said floatation member to said tow line through one of said slots to tow the marine apparatus at a first predetermined depth; and
   towing the marine apparatus at a second predetermined depth by connecting said floatation member to said tow line through another one of said slots.

* * * * *